United States Patent Office 2,754,337
Patented July 10, 1956

2,754,337

PREPARATION OF CYCLOHEPTATRIENES

Joseph S. Chirtel, Tallahassee, Fla., and Walter M. Halper, Denver, Colo., assignors to Shell Development Company, Emeryville, Calif., a corporation of Delaware No Drawing. Application January 6, 1953, Serial No. 329,926

4 Claims. (Cl. 260—666)

This invention relates to a process for the preparation of 1,3,5-cycloheptatriene compounds and to such 1,3,5-cycloheptatriene compounds themselves which contain at least one atom other than hydrogen in a substituent group thereof.

Cycloheptatriene, $C_7H_8$, has been prepared before (e. g., by Kohler, Tischler, Potter and Thompson, J. A. C. S., vol. 61, page 1057 et seq., 1939) by an extended sequence of preparations, beginning with cyclohexanone and going through cycloheptanone, cycloheptanol, bromocycloheptane, cycloheptene, dibromocycloheptane, cycloheptadiene and dibromocycloheptene, finally to cycloheptatriene, thus involving the preparation of seven intermediate compounds.

Cycloheptatriene has been reacted with maleic anhydride to form a 1:1 molecular adduct, namely, a cycloheptadiene compound, presumably by the Diels-Alder reaction. This adduct was hydrolyzed to give a dibasic acid and it was hydrogenated to the saturated anhydride which was hydrolyzed to the corresponding saturated dibasic acid. It is clear that hydrocarbons containing the conjugated cycloheptatriene nucleus are suitable compounds for the preparation of a wide variety of useful chemicals, such as in the fields of plasticizers for resins, resins themselves, and even for direct utility, for example as solvent for resins and the like. However, investigation of possible fields of utility of cycloheptatriene has been very restricted because of the lack of any reasonably practical method for its preparation. Heretofore, there has been no investigation of the possible fields of utility of substituted cycloheptatrienes since they have not been available substances.

It is, therefore, a principal object of this invention to provide a practical method for the preparation of cycloheptatriene and of hydrocarbon-substituted cycloheptatrienes. Another object is to provide the new compounds, hydrocarbon-substituted cycloheptatrienes.

It has now been discovered that organic compounds containing a 1,3,5-cycloheptatriene nucleus are readily prepared by thermal isomerization of compounds which contain a 1,4-methano-2,5-cyclohexadiene nucleus, i. e., a bicyclo-(2.2.1)-2,5-heptadiene nucleus, thereby effecting ring enlargement to a 1,3,5-cycloheptatriene. This isomerization and ring enlargement is effected by subjecting the 1,4-methano-2,5-cyclohexadiene compound to a suitable thermal isomerization at a considerably elevated temperature.

More particularly, it has been found that compounds containing a bicyclo-(2.2.1)-2,5-heptadiene nucleus are converted to cycloheptatriene compounds when subjected to a suitable thermal treatment, while avoiding the more severe thermal treatment which results in the formation of isomeric aromatic compounds.

The bicycloheptadiene hydrocarbons and their halogen derivatives, particularly fluoro- and chloro-derivatives, are particularly suitable substances to be used in the practice of the isomerization of the invention. Furthermore, those 1,3,5-cycloheptatrienes produced by the invention and which contain in the place of at least one hydrogen atom of cycloheptatriene a substituent comprising a non-metallic atom other than hydrogen are novel compounds.

It will be readily understood that the temperature required for the proper activation of the bicycloheptadiene compound for the present purpose depends on the particular nature of the given compound. Thus, whereas for bicyclo-(2.2.1)-2,5-heptadiene, a temperature of about 425° C. may be about the minimum temperature for reasonable activation, alkyl-substituted derivatives require a somewhat higher temperature. On the other hand, halogen substituents, because of their negative character, increase the thermal susceptibility and, therefore, lower the effective and optimum temperature for the conversion.

Because of the tendency of the bicyclo-(2.2.1)-2,5-heptadiene hydrocarbons to split into cyclopentadienes and acetylenes under the isomerization conditions, and because of the dangers associated with the handling of acetylenes at the temperatures required for the present process, it is generally preferable to restrict the thermal treatment of the material being processed to a reasonably short period of time.

The 1,4-methano-2,5-cyclohexadiene hydrocarbons, which are utilized as starting materials in this process, are obtainable by the Diels-Alder reaction of cyclopentadiene hydrocarbons with acetylenic hydrocarbons, as described in copending application, Serial No. 45,574, filed August 21, 1948. Those hydrocarbons containing no more than a total of 14 carbon atoms are particularly suitable, whereas the $C_7$ to $C_{10}$ bicycloheptadiene hydrocarbons are preferred starting materials, wherein the carbon atoms in addition to those in the bicycloheptadiene nucleus may be in one or more radicals.

Thus, as illustrative, cyclopentadiene is contacted in vapor phase with a molar excess of acetylene in a continuous process at a temperature of about 340° C. to yield the 1:1 molecular adduct, bicyclo-(2.2.1)-2,5-heptadiene. Similarly, other bicyclo-(2.2.1)-2,5-heptadiene hydrocarbons are obtained when other cyclopentadiene hydrocarbons and/or hydrocarbon-substituted acetylenes are utilized as reactants. Thus, the reaction of 1-methylcyclopentadiene-1,3 with acetylene yields 1-methyl-bicyclo-(2.2.1)-2,5-heptadiene; 2-methylcyclopentadiene-1,3 with acetylene yields 2-methylbicyclo-(2.2.1)-2,5-heptadiene; cyclopentadiene with methylacetylene (propyne) yields 2-methylbicyclo-(2.2.1)-2,5-heptadiene; 2-methylcyclopentadiene-1,3 with methylacetylene gives a mixture primarily of 2,5- and 2,6-dimethylbicyclo-(2.2.1)-2,5-heptadiene; cyclopentadiene with butyne-2 gives 2,3-dimethylbicyclo - (2.2.1) - 2,5 - heptadiene; 1-methylcyclopentadiene with butyne-2 gives 1,2,3-trimethylbicyclo-(2.2.1)-2,5-heptadiene; cyclopentadiene with hexyne-2 gives 2-methyl-3-propyl-bicyclo-(2.2.1)-2,5-heptadiene; and cyclopentadiene with n-octyne-1 yields 2-hexylbicyclo-(2.2.1)-2,5-heptadiene. The corresponding aryl-substituted bicycloheptadienes are also suitable starting materials, such as 2-phenylbicyclo-(2.2.1)-2,5-heptadiene, 2-methyl-6-phenylbicyclo-(2.2.1)-2,5-heptadiene, 2-benzylbicyclo-(2.2.1)-2,5-heptadiene, preparable from benzylcyclopentadiene (from cyclopentadienyl potassium and benzyl bromide) and acetylene.

The use of a 1,4-methano-2-cyclohexene hydrocarbon fused at the 5,6 carbon atoms with a hydrocarbon structure which splits off under the conditions of the conversion to yield a corresponding 1,4-methano-2,5-cyclohexadiene is also a suitable material for preparing a 1,3,5-cycloheptatriene by the process of the invention. Illustrative substances of this character are the Diels-Alder adducts of the foregoing bicyclo-(2.2.1)-2,5-heptadienes with a molecular proportion of a cyclopentadiene hydrocarbon to give a tetracyclododecadiene, such as tetracyclododeca-2,6-diene formed from bicyclo-(2.2.1)-2,5-heptadiene and cyclopentadiene; 2,7-dimethyl-tetracyclododeca-2,6-diene formed from 2-methylbicyclo-(2.2.1)-2,5-heptadiene and 2-methyl-cyclopentadiene; etc. Presumably in the case of these compounds the tetracyclo-compounds split off one molecule of the cyclopentadiene and the remaining bicyclic structure is isomerized to the cycloheptatriene structure.

Instead of using the bicycloheptadienes or the tetracyclododecadienes as starting material to be subjected to the specified isomerization conditions in the preparation of the cycloheptatrienes, the precursors for the formation of the bicycloheptadienes can be utilized, namely, the cyclopentadienes admixed with the acetylenes. However, because of the polymerizing tendency of the cyclopentadiene and of the safety precautions which are required in the handling of acetylene, it is preferable first to prepare the bicycloheptadiene, which is done under less drastic conditions, and then to isomerize the separated bicycloheptadiene. Similarly, the formation of cyclopentadiene from the tetracyclododecadiene represents a disadvantage in the use of the latter as starting materials.

Since the 1,4-methano-2,5-cyclohexadienes are isomeric with mononuclear aromatic hydrocarbons of the same carbon content, and since it is known already that thermal treatment of non-aromatic hydrocarbons at sufficiently elevated temperatures often results in their conversion to aromatic hydrocarbons, it was surprising to find that when the bicycloheptadiene hydrocarbons are subjected to thermal isomerization conditions at a temperature of about and substantially above 400° C. and for only a short residence time, substantial conversion to cycloheptatriene hydrocarbons was effected without appreciable conversion to the isomeric aromatic hydrocarbon.

As applied to isomerization of bicyclo-(2.2.1)-2,5-heptadiene hydrocarbons, the process of this invention is suitably carried out by flowing the bicyclo-(2.2.1)-2,5-heptadiene hydrocarbon as a vapor, either alone or in admixture with an inert diluent vapor or gas, such as nitrogen or carbon dioxide through a confined thermal conversion zone, preferably of reduced cross section, as compared with the length thereof, while maintaining the conversion zone at a temperature of from about 400° C. to about 500° C. Below this lower temperature there is substantially no conversion on account of the thermal stability of the bicycloheptadiene. At higher temperatures either decomposition of the cycloheptatriene occurs or the bicycloheptadiene is isomerized directly to the isomeric aromatic hydrocarbon, in addition to decomposition to yield carbon and light gases. Within the temperature range specified suitable conversion to the cycloheptatriene is obtained. The temperature range of 410°–490° C. represents one for more practical operation, while a particularly effective temperature is from about 425° to about 475° C.

The pressure within the reactor can be maintained at any suitable value of from about 5 to about 250 pounds per square inch absolute, preferably from about 10 to about 100 p. s. i. a. The same effective partial pressure of the bicycloheptadiene can be maintained while operating at a greater total reactor pressure by admixing the bicycloheptadiene with a suitable inert gas or vapor. It has been found to be convenient and effective to operate at a pressure just sufficiently above atmospheric to force the feed stream through the reaction zone at the required flow rate.

As already stated, it is advantageous to subject the feed material to the thermal isomerization treatment for only a relatively short period of time. The rate of flow of the bicycloheptadiene is regulated to provide a relatively short residence time within the reaction zone of the order of from a fraction of a second, e. g., one-half second to a fraction of a minute within the specified temperature range, such as a residence time of between about one-half and fifty seconds. Preferably, however, this residence time is between about one and twenty-five seconds, with a period of from one to ten seconds being particularly suitable. Of course, for optimum results, the residence time will be nearer the lower limit when the temperature is nearer the upper limit and nearer the higher limit when the temperature is nearer the lower limit. Increasing the severity of the treatment beyond the upper limits as specified, such as by subjecting the bicycloheptadiene to a temperature above 500° C. for a period of time substantially greater than about 25 seconds, results in undue conversion to other products. It has been found that a contact time of about 1 to 10 seconds at a temperature of about 425°–475° C., under a partial pressure of the bicycloheptadiene of about 10–100 pounds per square inch absolute, provides convenient and particularly effective operating conditions for the conversion of the bicycloheptadiene to the corresponding (isomeric) 1,3,5-cycloheptatriene.

Any suitable equipment may be employed for carrying out the thermal conversion. Since it is required to subject the starting material in vapor phase to the specified conversion temperature for a specified period of time, it is desirable to vaporize the material beforehand in a preheater or vaporizer and to heat it to a temperature approaching the reaction temperature, but at which substantially no conversion, or at most only a negligible amount of conversion, occurs. Thus, vaporizer and preheater may be provided so that the material is suitably vaporized and the vapors preheated to a temperature of about 250°–350° C., prior to being delivered to the reaction chamber which is suitably any vessel through which the material can be caused to flow and be heated therein quickly to, and maintained at, the conversion temperature for the required residence time. For example, it can be any suitable tube-type reaction chamber, such as an externally heated, straight or coiled tube. The reaction chamber or zone may be unobstructed or it can be packed with any suitable heat-stable solid material designed to provide turbulence and more uniform temperature conditions, such as a suitable contact mass as will be apparent to one skilled in the art.

In the application of the present invention to the isomerization of more thermally susceptible bicycloheptadienes, that is those which have lower activation energies, such as halogenated derivatives, a lower temperature is often suitable for the isomerization. Here also, since the tendency to be converted to other products such as aromatic compounds is minimized by the lower temperature, the reaction time may be increased materially. Thus, such more active bicycloheptadienes can be isomerized at a lower temperature over a longer period of time as in any suitable batch type of operation. A particularly representative substance of this type is 1,2,3,4,7,7-hexachlorobicyclo-(2.2.1)-2,5-heptadiene which is preparable by the reaction of hexachlorocyclopentadiene and vinyl chloride, followed by dehydrochlorination of the Diels-Alder adduct. An illustrative substance of intermediate thermal susceptibility is 2-chlorobicyclo-(2.2.1)-2,5-heptadiene which is preparable by the removal of one mole of HCl from each mole of 2,3-dichlorobicyclo-(2.2.1)-5-heptene (prepared from cyclopentadiene and ethylene dichloride). The corresponding fluorocompounds are of intermediate activity to the chloro compounds and the hydrocarbons.

A better understanding of the invention will be had from the following examples.

*Example I*

A run was made, wherein a stream of bicyclo-(2.2.1)-2,5-heptadiene (boiling point—92° C. at 760 mm. Hg) was vaporized and then preheated to a temperature of 235° C. This stream was then passed at essentially atmospheric pressure through a tubular isomerization zone of about 45 cm.$^3$ volume, formed by a nickel tube and maintained at a temperature of about 425° C., at a rate of about 0.3 g./cm.$^3$/min. giving an average residence time of about 2 seconds. The effluent product stream was immediately cooled and partially condensed by a suitable condensing system, with the separation of cracking products and non-condensibles boiling below 60° C. from the remainder. The condensate was fractionally distilled and 1,3,5-cycloheptatriene was recovered as a suitable fraction thereof. A per pass conversion to 1,3,5-cycloheptatriene of 25–30% was obtained. Only a trace of toluene was formed. The remainder of the conversion products comprised essentially cyclopentadiene and acetylene. The essential reactions involved are as follows:

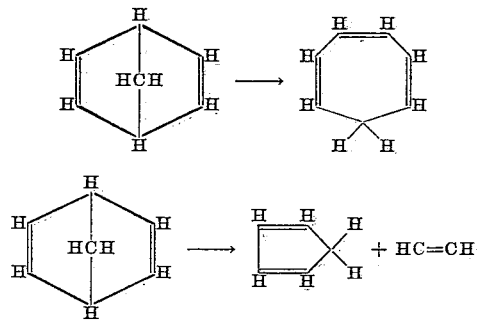

Example II

When the run in Example I was repeated, but the rate of flow was increased about 50% to about 0.45 g./cm.³/min. thereby decreasing the residence time to about 1.4 seconds, the conversion to cycloheptatriene was reduced to about 20%.

Example III

When the run in Example I was repeated, except that the temperature in the reaction zone was reduced to about 410° C., the conversion to cycloheptatriene was reduced to about 10%.

Example IV

When the run in Example I was repeated, except that the rate of flow was reduced to one-half what it was in Example I, thereby doubling the residence time to about 4 seconds, the conversion to cycloheptatriene was still the same, at about 25–30%.

The cycloheptatriene as prepared by this process was identified by comparison between its properties and those available from the literature, as well as the preparation of the adduct with maleic anhydride which had a melting point of 102–104° C., the same as that given by Kohler et al.

Example V

When tetracyclododeca-2,6-diene was subjected to thermal treatment at a temperature of about 465° C. for a residence time of about 10 seconds, there was a substantially complete conversion of it to cyclopentadiene, bicyclo-(2.2.1)-2,5-heptadiene, acetylene and cycloheptatriene and a minor proportion of toluene. The molar excess of cyclopentadiene over the sum of the bicycloheptadiene and acetylene corresponded essentially to the production of cycloheptatriene. The reactions can be represented as follows:

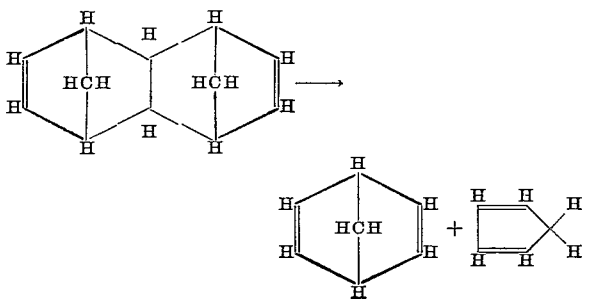

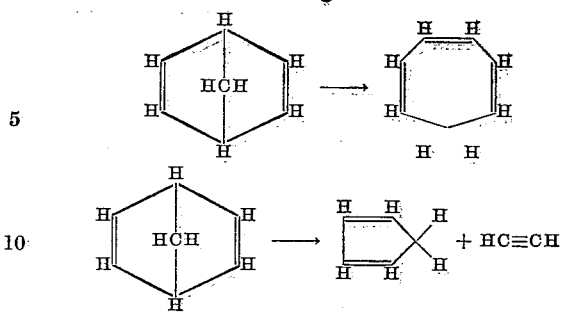

Example VI

A stream of 2-methylbicyclo-(2.2.1)-2,5-heptadiene (prepared from 2-methylcyclopentadiene-1,3 and acetylene and boiling at 104° C. at 640 mm. Hg) was vaporized and preheated to a temperature of about 350° C. This stream of preheated material was then passed through a tubular reaction zone made of nickel wherein it was heated to, and maintained at, a temperature of about 475° C. and substantially atmospheric pressure, for a residence time of about 2 seconds. The conversion to methylcycloheptatriene was about 30% by weight, based on feed. Other products of the reaction were 3-methylcyclopentadiene, cyclopentadiene, acetylene, methylacetylene, ortho-, meta- and para-xylenes and ethyl benzene. The fraction boiling at about 62–64° C. at 60 mm. Hg (about 130° C. at 634 mm. Hg) had the following properties: Molecular wt.=103; percent wt. carbon=90.3; percent wt. hydrogen=9.5; empirical formula=$C_8H_{10}$; specific gravity (20°/4° C.)=0.8755; refractive index (D/26° C.)=1.5101; hydrogenation value=ca. 3 moles/mole; ultraviolet scan in $CS_2$ gives a peak at 260 mu. The infrared spectroscopic analysis indicated it to have a structure similar to cycloheptatriene-1,3,5.

Example VII

When Example VI was repeated, but at a reactor temperature of about 400° C., there was only a very small conversion of the methylbicycloheptadiene.

Example VIII

When Example VI was repeated, but at a reactor temperature of about 575° C., there was a complete conversion of the methylbicycloheptadiene to the isomeric aromatic hydrocarbons, ortho-, meta-and para-xylenes and a trace of ethyl benzene.

Example IX

A portion of purified 1,2,3,4,7,7-hexachlorobicyclo-(2.2.1)-2,5-heptadiene (prepared by the Diels-Alder adduction of hexachlorocyclopentadiene and vinyl chloride followed by dehydrochlorination with caustic, as described in copending application Serial No. 156,716, filed April 18, 1950, now Patent No. 2,676,132) was charged to a vessel of about ten times its volume. The reaction vessel was fitted with a heating mantle, thermocouple well and a long, air-cooled condenser. A liquid trap and water-cooled condenser were joined to the top of the air-cooled condenser.

Heat was gradually applied to the reaction vessel, and at a temperature of 150° C., the material appeared to be relatively stable although some darkening occurred. Further darkening occurred as the temperature of the liquid reactant was raised to 195° C. accompanied by slight boiling. The boiling or ebullition became more vigorous at 205° C., at which time the external source of heat was cut off. Following an incubation period of several minutes during which heat started to evolve, the boiling became violent and the temperature rose to a maximum of 315° C., about one minute after the reaction ensued with vigor. Depending on the rate of heat dissipation, the reaction was completed in 3 to 6 stages accompanied by a corresponding number of distinct eruptions in the reaction vessel.

There was no appreciable degree of decomposition during the reaction as shown by no change in weight between the charge and the product mixture. Tests for free chlorine and hydrogen chloride were negative.

A sample of the large center cut derived by fractionating the composite product under reduced pressure had the following physical and chemical properties:

Boiling point
- 122° C. at 1.5 mm. Hg.
- 131° C. at 2.5 mm. Hg.
- 143° C. at 3.5 mm. Hg.
- 147° C. at 4.0 mm. Hg.
- 155° C. at 5.0 mm. Hg.
- 167° C. at 7.0 mm. Hg.

Freezing point_____ Minus 40° C. (not sharp).
Refractive Index____ 1.6050 at 25° C.
Specific gravity_____ 1.705 at 24° C.
Molecular wt_____ 302 (in camphor).
Elemental analysis___ C=27.6%; H=0.57%; Cl=71.2%.
Empirical formula___ $C_7H_2Cl_6$.
Hydrogenation_____ 0.98 mole/mole.
U. V. absorption____ 285 mu and 293 mu maxima.

In comparison, the starting material had the following properties:

Boiling point
- 85° C. at 1.0 mm. Hg.
- 105.3° C. at 4.0 mm. Hg.
- 117.0° C. at 7.7 mm. Hg.

Freezing point_____ −4° C.

The spectrographic analyses (ultraviolet and infrared) indicated the material to have the cycloheptatriene structure. Based on the physical and chemical properties, the novel product is considered to be a hexachlorocyclohepta-1,3,5-triene. Furthermore, it appears that the conversion is representable as follows:

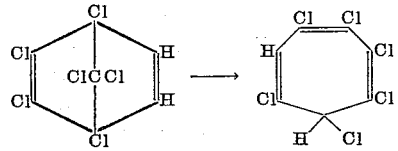

Treatment of a representative portion of the total reaction product mixture with caustic indicated about 10% of the total mixture to be a trichlorobenzotrichloride, the remaining 90% being the hexachlorocycloheptatriene.

We claim as our invention:

1. The isomerization of bicyclo-(2.2.1)-2,5-heptadiene to 1,3,5-cycloheptatriene by passing it through a reaction zone in which it is heated at a temperature of about 425–475° C. under substantially atmospheric pressure for a time of about 1–10 seconds.

2. The isomerization of a $C_{7-10}$ bicyclo-(2.2.1)-2,5-heptadiene hydrocarbon to a corresponding $C_{7-10}$-1,3,5-cycloheptatriene hydrocarbon by passing it through a reaction zone in which it is heated at a temperature of from about 410° C. to about 490° C. under a pressure of about 10–100 pounds per square inch absolute for a time of about 1–25 seconds.

3. The isomerization of a bicyclo-(2.2.1)-2,5-heptadiene hydrocarbon to a 1,3,5-cycloheptatriene hydrocarbon by passing it through a reaction zone in which it is heated at a temperature of from about 400° C. to about 500° C. for a time of about one-half to 50 seconds.

4. The conversion of a bicyclo-(2.2.1)-2,5-heptadiene to a 1,3,5-cycloheptatriene by passing it through a reaction zone in which it is heated at a temperature of from about 400° C. to about 500° C. for a time of one-half to 50 seconds.

References Cited in the file of this patent

UNITED STATES PATENTS

| | | |
|---|---|---|
| 2,401,414 | Doumani | June 4, 1946 |
| 2,481,160 | Schmerling | Sept. 6, 1949 |
| 2,537,638 | Kitchen | June 6, 1951 |
| 2,626,921 | Eberly | Jan. 27, 1953 |
| 2,629,750 | Rath | Feb. 24, 1953 |
| 2,647,081 | Doering et al. | July 28, 1953 |